(12) United States Patent
Kubota

(10) Patent No.: US 10,048,376 B2
(45) Date of Patent: Aug. 14, 2018

(54) DISTANCE MEASURING DEVICE AND PHOTODETECTOR

(71) Applicant: Kabushiki Kaisha Toshiba, Minato-Ku, Tokyo (JP)

(72) Inventor: Hiroshi Kubota, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 228 days.

(21) Appl. No.: 14/847,518

(22) Filed: Sep. 8, 2015

(65) Prior Publication Data
US 2016/0266253 A1  Sep. 15, 2016

(30) Foreign Application Priority Data

Mar. 13, 2015  (JP) .................. 2015-051217

(51) Int. Cl.
| | | |
|---|---|---|
| G01S 17/10 | (2006.01) | |
| G01S 17/42 | (2006.01) | |
| G01S 7/48 | (2006.01) | |
| G01S 7/497 | (2006.01) | |
| G01S 7/481 | (2006.01) | |
| G01S 7/486 | (2006.01) | |

(52) U.S. Cl.
CPC .......... *G01S 17/105* (2013.01); *G01S 7/4816* (2013.01); *G01S 7/4868* (2013.01); *G01S 7/497* (2013.01); *G01S 17/42* (2013.01)

(58) Field of Classification Search
CPC ..... G01S 17/105; G01S 7/4816; G01S 7/4868
See application file for complete search history.

(56) References Cited

U.S. PATENT DOCUMENTS

| | | | |
|---|---|---|---|
| 5,644,124 A * | 7/1997 | Hamada | G02B 5/285 |
| | | | 250/216 |
| 6,833,909 B2 | 12/2004 | Schmidt et al. | |
| 2005/0062863 A1* | 3/2005 | Takeuchi | H01L 27/14621 |
| | | | 348/272 |
| 2009/0009747 A1 | 1/2009 | Wolf et al. | |

(Continued)

FOREIGN PATENT DOCUMENTS

| | | |
|---|---|---|
| JP | H06-162885 A | 6/1994 |
| JP | H08-320219 A | 12/1996 |

(Continued)

*Primary Examiner* — Eric L Bolda
(74) *Attorney, Agent, or Firm* — White & Case LLP

(57) ABSTRACT

According to an embodiment, a distance measuring device includes a light source, a reflection device, a first photodetector and a calculation unit. The reflection device includes a reflection surface configured to scan an object to be measured with light by reflecting the light, and configured to reflect scattered light of the light scattered on the object to be measured. The first photodetector detects the scattered light. The calculation unit calculates a distance from the reflection surface to each of positions on the object to be measured based on a detection result of the first photodetector. The first photodetector includes a photoelectric conversion element including a plurality of detection regions each having different detection sensitivity of the light. The detection regions are arranged in order according to an incident position of the scattered light from the object to be measured at each of positions having the different distance.

20 Claims, 8 Drawing Sheets

(56) References Cited

U.S. PATENT DOCUMENTS

| | | | | |
|---|---|---|---|---|
| 2009/0213371 | A1* | 8/2009 | Goodyer | G01J 3/02 |
| | | | | 356/319 |
| 2012/0081692 | A1* | 4/2012 | Nagai | G01C 3/08 |
| | | | | 356/4.01 |
| 2012/0200842 | A1 | 8/2012 | Kamiyama et al. | |
| 2014/0300887 | A1* | 10/2014 | Yamamoto | G01S 17/08 |
| | | | | 356/5.01 |
| 2016/0111457 | A1* | 4/2016 | Sekine | H01L 31/10 |
| | | | | 257/228 |
| 2016/0282451 | A1* | 9/2016 | Hartman | G01S 7/4868 |

FOREIGN PATENT DOCUMENTS

| | | | | |
|---|---|---|---|---|
| JP | 2014-071026 A | | 4/2014 | |
| JP | 2014202610 A | * | 10/2014 | G01S 17/08 |

\* cited by examiner

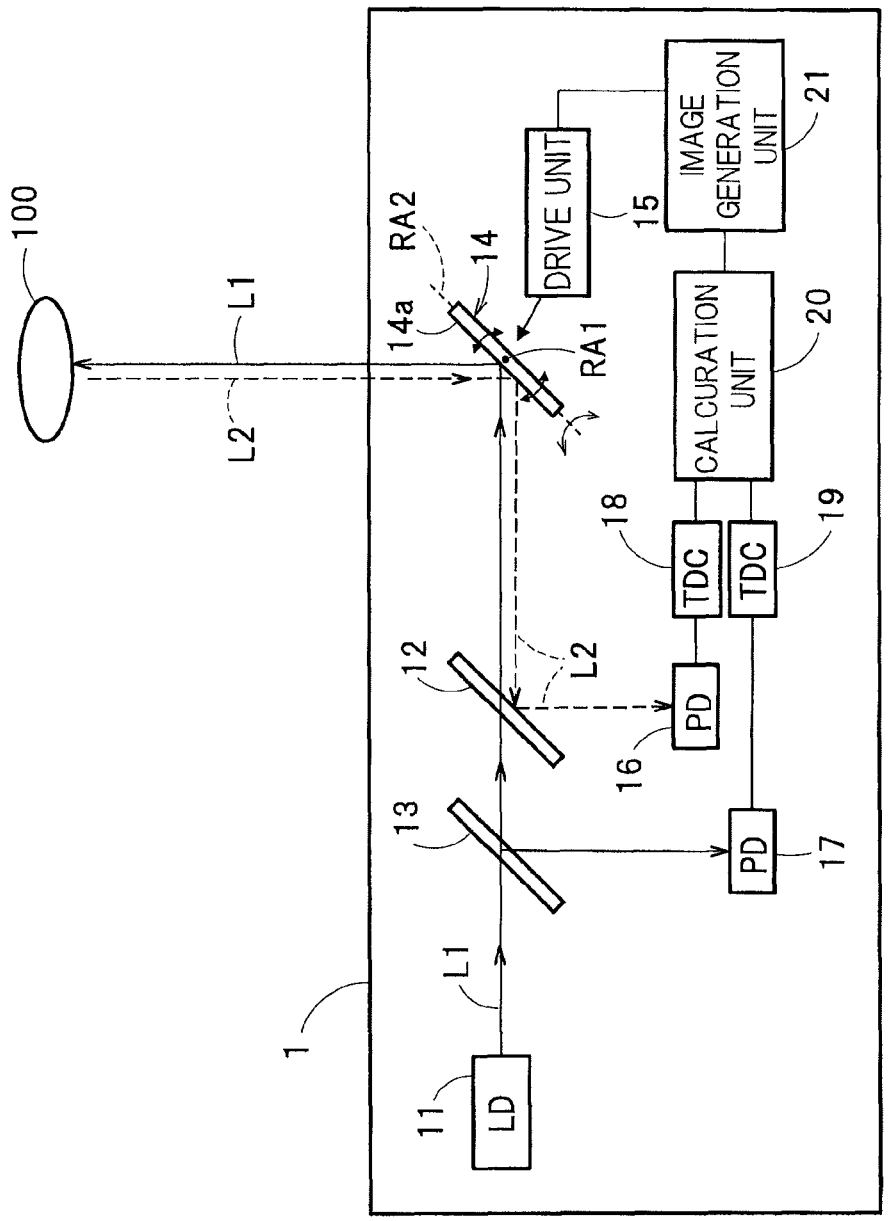
F I G. 1

| 1 | 2 | 3 | 4 | 5 | 6 |
| --- | --- | --- | --- | --- | --- |
| 7 | 8 | 9 | 10 | 11 | 12 |
| 13 | 14 | 15 | 16 | 17 | 18 |
| 19 | 20 | 21 | 22 | 23 | 24 |

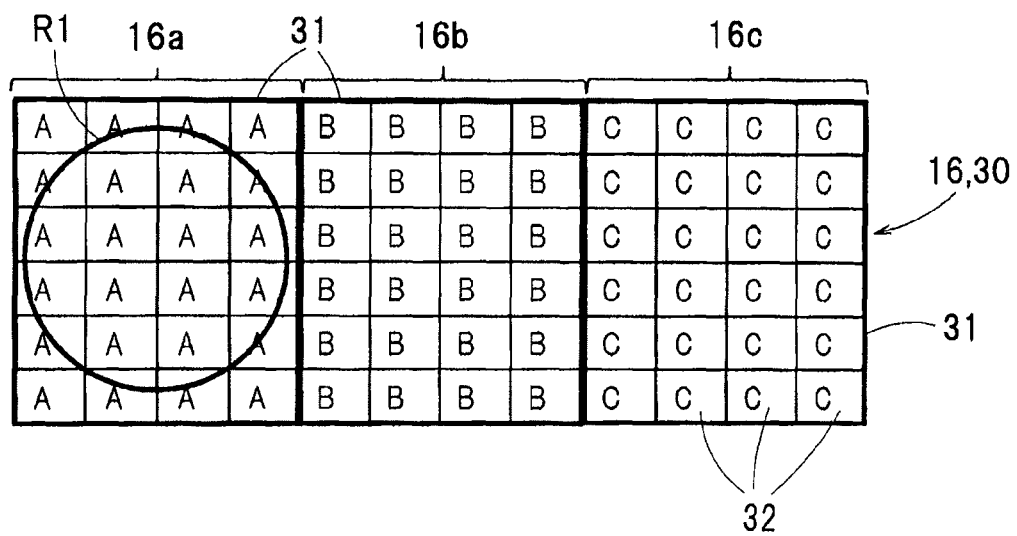
F I G. 4A
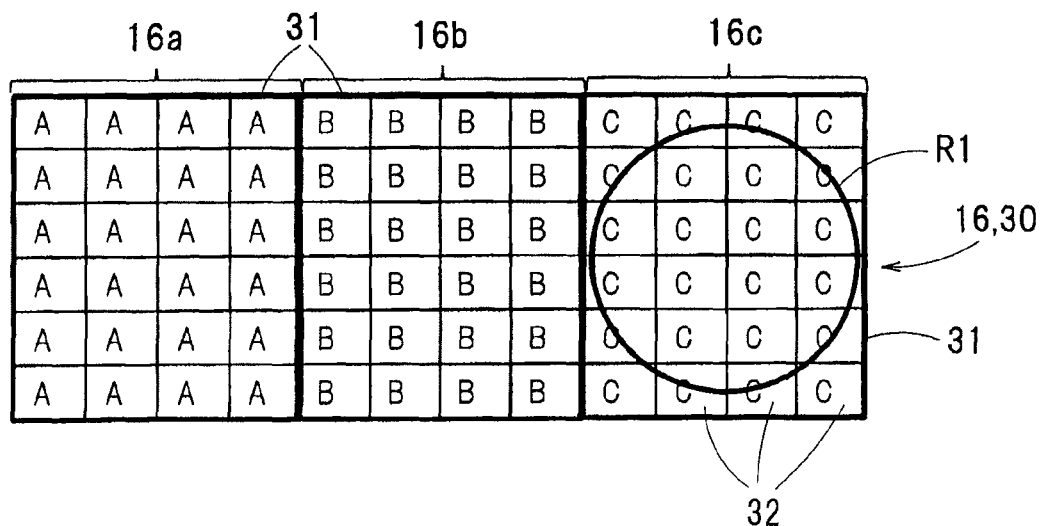
F I G. 4B

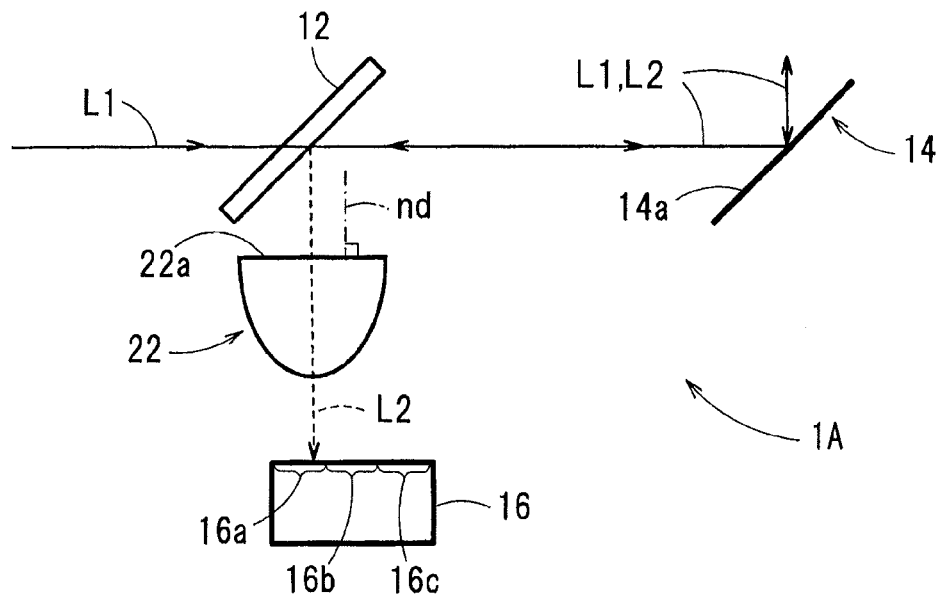
F I G. 12A
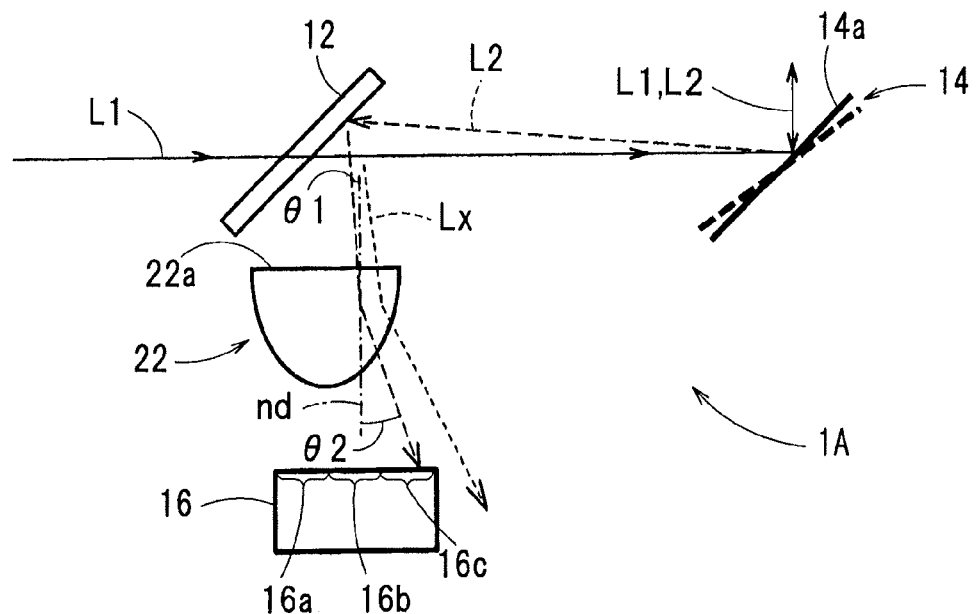
F I G. 12B

DISTANCE MEASURING DEVICE AND PHOTODETECTOR

CROSS REFERENCE TO RELATED APPLICATION

This application is based upon and claims the benefit of priority from the prior Japanese Patent Application No. 2015-051217 filed on Mar. 13, 2015 in Japan, the entire contents of which are incorporated herein by reference.

FIELD

Embodiments described herein relate generally to a distance measuring device and a photodetector.

BACKGROUND

There has been known a distance measuring device using a time-of-flight (TOF) method. In this device, an object to be measured is irradiated with pulsed light from a light source, and scattered light that has been scattered by the object to be measured is detected by a photodetector. A reciprocation time of light becomes longer as a distance from the distance measuring device to the object to be measured, or an optical path length, becomes longer. Accordingly, it is possible to measure the distance by using a time difference between timing in which the light source emits the light and timing in which the scattered light is detected. Furthermore, by scanning the object to be measured with the pulsed light and measuring the distance to each of positions on the object to be measured, it is possible to generate a range image of the object to be measured.

Since intensity of the scattered light varies according to the distance and a type of the object to be measured (reflectance), an amount of variation thereof is relatively large. Accordingly, a dynamic range of the photodetector, which detects the scattered light, may be insufficient in some cases. In such cases, a range-finding error may occur.

BRIEF DESCRIPTION OF THE DRAWINGS

FIG. 1 is a view illustrating a schematic configuration of a distance measuring device according to a first embodiment.

FIGS. 4A and 4B are planar views illustrating an example of a first photodetector.

FIGS. 12A and 12B are views illustrating a schematic configuration of a part of a distance measuring device according to a second embodiment.

DETAILED DESCRIPTION

Figures 2A, 2B:
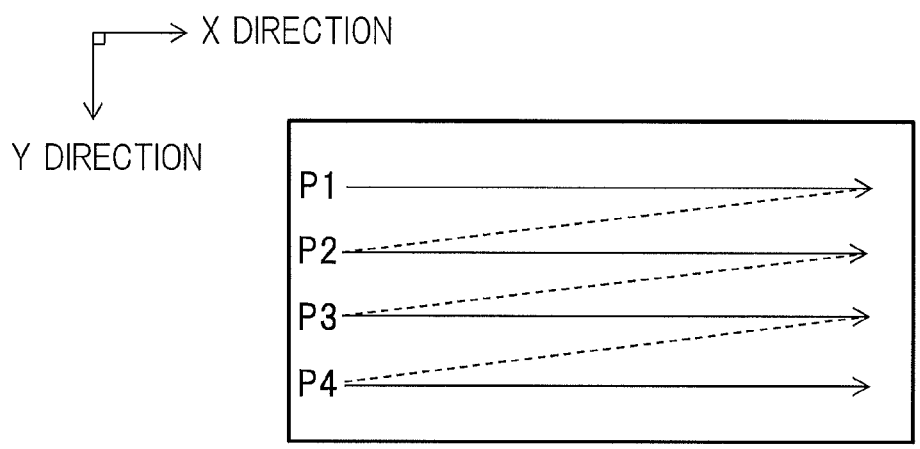
FIG. 2A is a view illustrating a scanning route of a light on an object to be measured.
FIG. 2B is a view illustrating a pixel array of a range image to be generated.

According to an embodiment, a distance measuring device includes a light source, a reflection device, a first photodetector and a calculation unit. The light source is configured to intermittently emit light. The reflection device includes a reflection surface. The reflection surface is configured to scan an object to be measured with the light by reflecting the light, and configured to reflect scattered light of the light scattered on the object to be measured. The first photodetector is configured to detect the scattered light that has been reflected. The calculation unit is configured to calculate a distance from the reflection surface to each of positions on the object to be measured based on a detection result of the first photodetector. The first photodetector includes a photoelectric conversion element including a plurality of detection regions each having different detection sensitivity of the light. The plurality of detection regions is arranged in order according to an incident position of the scattered light from the object to be measured at each of positions having the different distance.

Embodiments will now be explained with reference to the accompanying drawings.

(First Embodiment)

FIG. 1 is a view illustrating a schematic configuration of a distance measuring device 1 according to a first embodiment. By using a scanning method and a TOF method, the distance measuring device 1 generates a range image of an object to be measured 100. The distance measuring device 1 has a light source 11, a first optical element 12, a second optical element 13, a reflection device (movable mirror) 14, a drive unit 15, a first photodetector 16, a second photodetector 17, a time-to-digital converters (TDCs) 18 and 19, a calculation unit 20, and an image generation unit 21.

The light source 11 is, for example, a laser beam source such as a laser diode, and intermittently emits a light L1. In other words, the light L1 is a pulsed light. On an optical path of the light L1, which has been emitted from the light source 11, the first and second optical elements 12 and 13 as well as the reflection device 14 are provided.

The first optical element 12 is provided between the light source 11 and the reflection device 14, specifically between the second optical element 13 and the reflection device 14. The first optical element 12 allows the light L1, which has passed through the second optical element 13, to pass through it and causes the light L1 to enter the reflection device 14.

The second optical element 13 is provided between the light source 11 and the reflection device 14, specifically between the light source 11 and the first optical element 12. The second optical element 13 allows the light L1 to pass through it and causes a part of the light L1 to enter the second photodetector 17. The second optical element 13, for example, may be a splitter and the like.

The reflection device 14 has a reflection surface 14a that reflects the light L1, which has been emitted from the light source 11. By changing a reflection direction of the light L1, the reflection surface 14a scans the object to be measured 100 with the light L1 that has been reflected, and reflects a scattered light L2 of the light L1 that has been scattered on the object to be measured 100. Following control by the drive unit 15, the reflection device 14 changes the reflection direction of the light L1 by continuously changing an inclination angle of the reflection surface 14a. The reflection surface 14a is rotatable, for example, centering on two rotation axis lines RA1 and RA2 that are crossing one another.

FIG. 2A is a view illustrating a scanning route of the light L1 on the object to be measured 100. The reflection surface 14a scans, with the light L1, a plurality of straight routes that are substantially parallel to each other on the object to be measured 100 in a horizontal direction in order, by shifting in a vertical direction. In other words, as illustrated in FIG. 2A, a straight route P1 is scanned with the light L1 in an x direction (horizontal direction). Next, a straight route P2 that is shifted in a y direction (vertical direction) is scanned with the light L1 in the x direction. Specifically, the reflection surface 14a is continuously rotated clockwise centering on the rotation axis line RA1 for scanning with the light L1 in the x direction. When scanning of one straight route is completed, the reflection surface 14a returns to an original position relative to the rotation axis line RA1, rotates only by a predetermined angle centering on the rotation axis line RA2, and shifts an irradiation position of the light L1 in the y direction. In this way, each of the straight routes P1 to P4 is irradiated with the pulsed light. Note that the number of the straight routes and a scanning direction are not particularly limited.

Hereinafter, a description will be given on the light L1.

As illustrated in FIG. 1, the light L1 is emitted to the object to be measured 100 and is scattered on the object to be measured 100. The light L1 that has been scattered on the object to be measured 100 (hereinafter, referred to as the scattered light L2) advances an optical path, which is substantially the same as the optical path of the light L1, in an opposite direction. The scattered light L2 is also a pulsed light. The scattered light L2 that is reflected by the reflection surface 14a enters the first optical element 12.

Note that in FIG. 1, for a purpose of clarification, the optical paths of the light L1 and the scattered light L2 are illustrated separately; however, these are substantially overlapped in actuality. Also, an optical path at the center of luminous flux of the light L1 and an optical path at the center of luminous flux of the scattered light L2 are illustrated. Scattered light that advances an optical path other than that of the illustrated luminous flux of the scattered light L2 is not illustrated because it does not enter the first photodetector 16.

The first optical element 12 changes a travelling direction of the scattered light L2, that has been reflected by the reflection surface 14a, and causes the scattered light L2 to enter the first photodetector 16. The first optical element 12 may be, for example, a half mirror. The first optical element 12 may also be a mirror in which a hole, through which the light L1 passes, is formed and that reflects the scattered light L2.

The first photodetector 16 detects the scattered light L2 that has been reflected by the reflection surface 14a and that is incident from the first optical element 12. The second photodetector 17 detects the light L1 that is incident from the second optical element 13.

The TDC 18 measures timing in which the scattered light L2 is detected by the first photodetector 16. The TDC 19 measures timing in which the light L1 is detected by the second photodetector 17. Information of the timing measured by the TDCs 18 and 19 is output to the calculation unit 20.

The calculation unit 20 calculates a distance (optical path difference) from the reflection surface 14a to a position irradiated with the light L1 of the object to be measured 100 based on a detection result of the first photodetector 16. Specifically, the calculation unit 20 calculates the distance by using a time difference between the timing in which the light L1 is detected by the second photodetector 17 and the timing in which the scattered light L2 is detected by the first photodetector 16. The larger the time difference is, the longer the distance becomes. This calculation of the distance is performed for each of a plurality of pulsed lights.

The image generation unit 21 generates the range image of the object to be measured 100 based on the distance that has been calculated and the inclination angle of the reflection surface 14a. The inclination angle of the reflection surface 14a can be specified by a signal supplied from the drive unit 15 to the image generation unit 21. The position irradiated with the light L1 of the object to be measured 100 can be specified by the inclination angle. Each of pixels of the range image to be generated is based on the distance to each of corresponding positions of the object to be measured 100. Therefore, the range image mirrors a surface shape (three-dimensional shape) of the object to be measured 100.

FIG. 2B is a view illustrating a pixel array of the range image to be generated. By scanning illustrated in FIG. 2A, information (distance) of a pixel is obtained in an order denoted with the number in FIG. 2B. For example, the information of the first to the sixth pixels is obtained by the scanning of the straight route P1. In this case, the light L1 is emitted to each of the positions of the object to be measured 100 corresponding to the first to the sixth pixels. The number of pixels is not particularly limited.

The light source 11, the first optical element 12, the reflection device 14, and the first photodetector 16 constitute a coaxial optical system. Accordingly, ambient light hardly enters the first photodetector 16. Thus, although an influence of the ambient light remains, the calculation of the distance is relatively insusceptible to the influence of the ambient light.

Figure 3A:
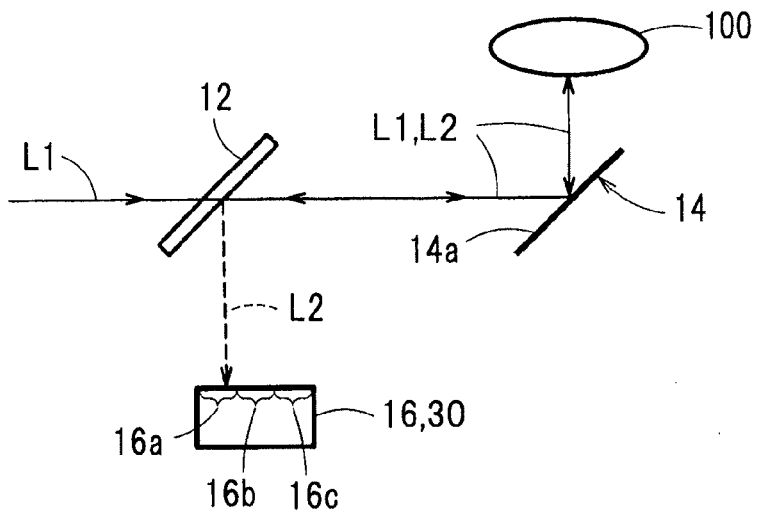
FIGS. 3A and 3B are views illustrating an optical path of a scattered light.
Figure 3B:
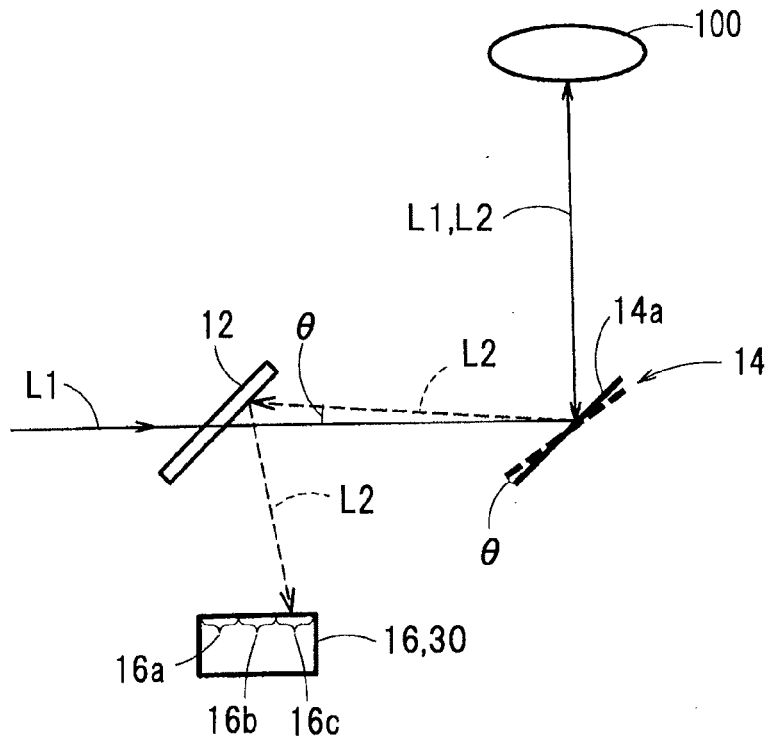

In this embodiment, a position where the scattered light L2 enters the first photodetector 16 changes according to the distance. FIGS. 3A and 3B are views illustrating the optical path of the scattered light L2. In FIG. 3A, a case where the distance is short is illustrated, and in FIG. 3B, a case where the distance is long is illustrated.

The first photodetector 16 includes a photoelectric conversion element 30 having a plurality of detection regions 16a, 16b, and 16c each having different detection sensitivity of light. The detection regions 16a to 16c are arranged in an order of the detection sensitivity according to an incident position of the scattered light L2 from the object to be measured 100 at each of positions having the different distance. Specifically, the detection regions 16a to 16c are arranged such that the scattered light enters a detection region having higher detection sensitivity as the distance becomes longer. The detection region 16a has the lowest detection sensitivity, the detection region 16b has medium detection sensitivity, and the detection region 16c has the highest detection sensitivity. The number of the detection regions 16a to 16c is not particularly limited.

The reflection surface 14a is rotated at a fixed speed from when the light L1 is reflected by the reflection surface 14a to when the light L1 is scattered on the object to be measured 100 and the returned scattered light L2 is reflected by the reflection surface 14a. Accordingly, the inclination angle of the reflection surface 14a changes in the meantime, and the longer the distance is, the larger an amount of change of the inclination angle becomes. Note that the reflection surface 14a is continuously rotated clockwise until the scattered light L2 of the light L1 emitted at an end of each of the straight routes P1 to P4 in FIG. 2A, or the light L1 corresponding to each of the sixth, twelfth, eighteenth, and twenty forth pixels in FIG. 2B, is reflected by the reflection surface 14a. In other words, after the scattered light L2 of the light L1 corresponding to each of the sixth, twelfth, eighteenth, and twenty forth pixels in FIG. 2B is reflected by the reflection surface 14a, the reflection surface 14a scans the next straight route with the light L1.

The amount of change of the inclination angle of the reflection surface 14a is smaller when the distance is short than when the distance is long. In an example in FIG. 3A, to clarify a description, it is assumed that the amount of change of the inclination angle is substantially zero. Accordingly, the optical path of the scattered light L2, which is reflected by the reflection surface 14a and is advancing toward the first optical element 12, is substantially equal to the optical path of the light L1, which is advancing from the first optical element 12 toward the reflection surface 14a.

On the other hand, the amount of change θ of the inclination angle of the reflection surface 14a is larger when the distance is long than when the distance is short. Accordingly, the optical path of the scattered light L2, which is reflected by the reflection surface 14a and is advancing toward the first optical element 12, is different from the optical path of the light L1, which is advancing from the first optical element 12 toward the reflection surface 14a. Specifically, an angle formed by the optical path of the scattered light L2 and the optical path of the light L1 is substantially equal to the amount of change θ of the inclination angle of the reflection surface 14a.

Thus, an incident angle and an incident position of the scattered light L2 entering the first optical element 12 is different according to the distance to the object to be measured 100. Accordingly, the position where the scattered light L2 enters the first photodetector 16 is different according to the distance. Also, intensity of the scattered light L2 entering the first photodetector 16 becomes lower as the distance becomes longer. Therefore, the position where the strong scattered light L2 enters the first photodetector 16 is different from the position where the weak scattered light L2 enters the first photodetector 16. When the distance is short, the strong scattered light L2 enters the detection region 16a having the low detection sensitivity (FIG. 3A). When the distance is medium, the scattered light L2 of medium intensity enters the detection region 16b having the medium detection sensitivity (not illustrated). When the distance is long, the weak scattered light L2 enters the detection region 16c having the high detection sensitivity (FIG. 3B).

Therefore, in each of the detection regions 16a to 16c, a variation range of the intensity of the incident scattered light L2 is relatively small. Accordingly, the first photodetector 16 is not saturated even if a dynamic range of the detection sensitivity of each of the detection regions 16a to 16c is smaller than the entire variation range of the intensity of the scattered light L2, and a large dynamic range can be realized in the first photodetector 16 as a whole. Therefore, a range-finding error can be reduced. Note, however, that it is necessary to set the dynamic range of the detection sensitivity of each of the detection regions 16a to 16c to a level not saturated by the ambient light having a predetermined intensity since the ambient light regularly enters each of the detection regions 16a to 16c.

The intensity of the scattered light L2 is, in general, proportional to the negative second power of the distance. A reflectance of the object to be measured 100 is different according to a type (material) of the object to be measured 100. For example, when it is assumed that a range-findable range is ten times and a variation range of the reflectance is ten times, the variation range of the intensity of the scattered light L2 is approximately one thousand times. It is very difficult to realize this dynamic range in a general photodetector. However, in this embodiment, the large dynamic range can be easily realized in the first photodetector 16 as a whole.

[Configuration of the First Photodetector 16]

FIGS. 4A and 4B are planar views illustrating an example of the first photodetector 16. FIGS. 4A and 4B are the views in which the first photodetector 16 is observed from an incident surface side of the scattered light L2.

The photoelectric conversion element 30 has a photon counting device 31 that counts the number of incident photons arranged in each of the detection regions 16a to 16c. The photon counting device 31 has a plurality of photon counting elements 32 arranged in a matrix. For example, a silicon photomultiplier (SiPM) may be used as the photon counting device 31.

The photon counting device 31 has different detection efficiency in each of the detection regions 16a to 16c. For example, the detection efficiency of the detection region 16a is A (=10%), the detection efficiency of the detection region 16b is B (=50%), and the detection efficiency of the detection region 16c is C (=100%).

In the FIG. 4A, a region R1 where the scattered light L2 enters is illustrated in correspondence with FIG. 3A. When the distance to the object to be measured 100 is short, the scattered light L2 enters the detection region 16a having the lowest detection sensitivity.

In FIG. 4B, the region R1 where the scattered light L2 enters is illustrated in correspondence with FIG. 3B. When the distance to the object to be measured 100 is long, the scattered light L2 enters the detection region 16c having the highest detection sensitivity.

In the example in FIGS. 4A and 4B, a plurality of photon counting devices 31 each having the different detection efficiency is used; however, it is also possible to use one photon counting device 31.

Figure 5:
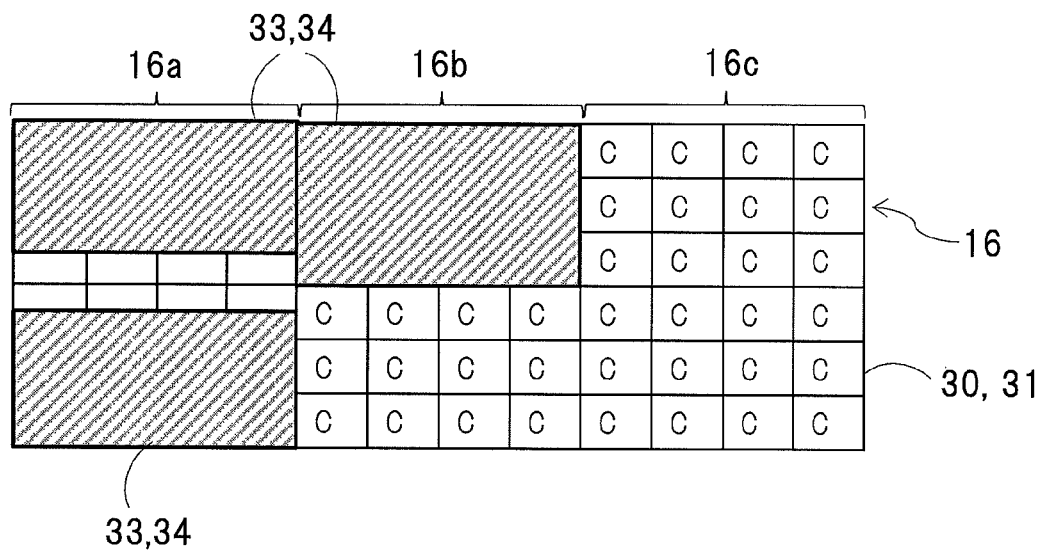
FIG. 5 is a planar view illustrating another example of the first photodetector.

FIG. 5 is a planar view illustrating another example of the first photodetector 16. The photoelectric conversion element 30 in FIG. 5 has one photon counting device 31. The photon counting device 31 has fixed detection efficiency (for example, C=100%) in the detection regions 16a to 16c.

The first photodetector 16 has an incident amount limiting member 33 that limits an incident light amount to the photoelectric conversion element 30 to an incident amount according to the detection sensitivity. The incident amount limiting member 33 is a light shielding layer 34 that shields the light, and it may be, for example, a black resin and the like.

In FIG. 5, the incident amount limiting member 33 is provided to the detection regions 16a and 16b. An area of the light shielding layer 34 is smaller in the detection region 16b than in the detection region 16a. The light shielding layer 34 is not provided to the detection region 16c. Therefore, an area of the photon counting device 31 where the light may enter is the largest in the detection region 16c and is the smallest in the detection region 16a. In this way, a rate of open area of the photon counting device 31 is different in each of the detection regions. As a result, it is possible to set different detection sensitivity for each of the detection regions.

Figure 6:
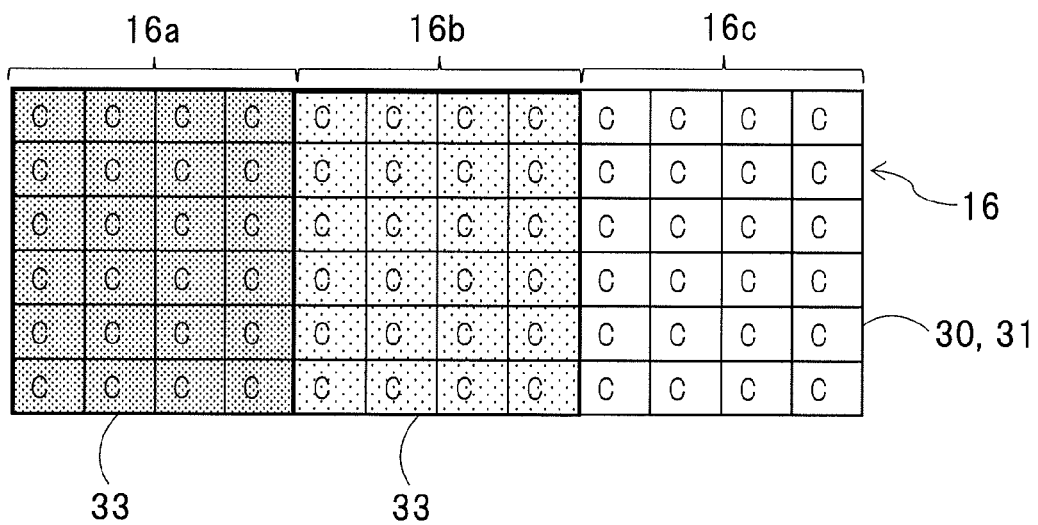
FIG. 6 is a planar view illustrating another example of the first photodetector.

FIG. 6 is a planar view illustrating another example of the first photodetector 16. The incident amount limiting member 33 has a light transmittance according to the detection sensitivity. The incident amount limiting member 33, for example, may be a film and the like constituted of resin.

The incident amount limiting member 33 covers the photon counting device 31. In FIG. 6, the incident amount limiting member 33 is provided to the detection regions 16a and 16b. The transmittance of the incident amount limiting member 33 is higher in the detection region 16b than in the detection region 16a. The incident amount limiting member 33 is not provided to the detection region 16c. Therefore, the incident light amount to the detection region 16c becomes large, and the incident light amount to the detection region 16a becomes small. As a result, the different detection sensitivity can be set for each of the detection regions.

Since it is not necessary to set the photon counting device 31 to a plurality of detection efficiency levels, the first photodetector 16 in FIGS. 5 and 6 can be realized by a configuration that is less costly and simpler than the configuration in FIGS. 4A and 4B.

Figure 7:
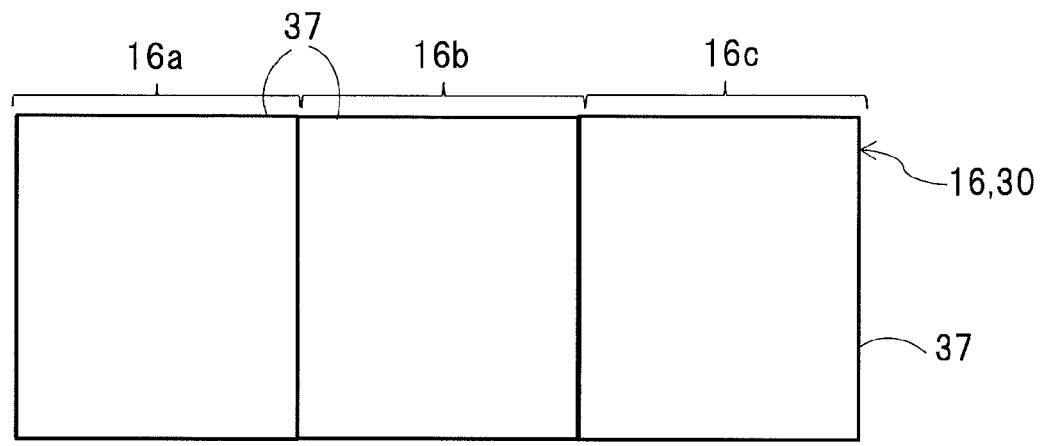
FIG. 7 is a planar view illustrating another example of the first photodetector.

Furthermore, a photodiode may be used as the photoelectric conversion element 30. FIG. 7 is a planar view illustrating another example of the first photodetector 16. The photoelectric conversion element 30 has a photodiode 37 that is arranged in each of the detection regions 16a to 16c. Detection sensitivity of the photodiode 37 in the detection region 16a is the lowest, detection sensitivity of the photodiode 37 in the detection region 16b is medium, and detection sensitivity of the photodiode 37 in the detection region 16c is the highest. The photodiode 37 continuously changes an output signal according to the incident light amount.

The photodiode 37 may be an avalanche photodiode having a multiplication factor according to the detection sensitivity. In this case, a bias voltage according to the multiplication factor may be supplied to each of the photodiodes 37.

Figure 8:
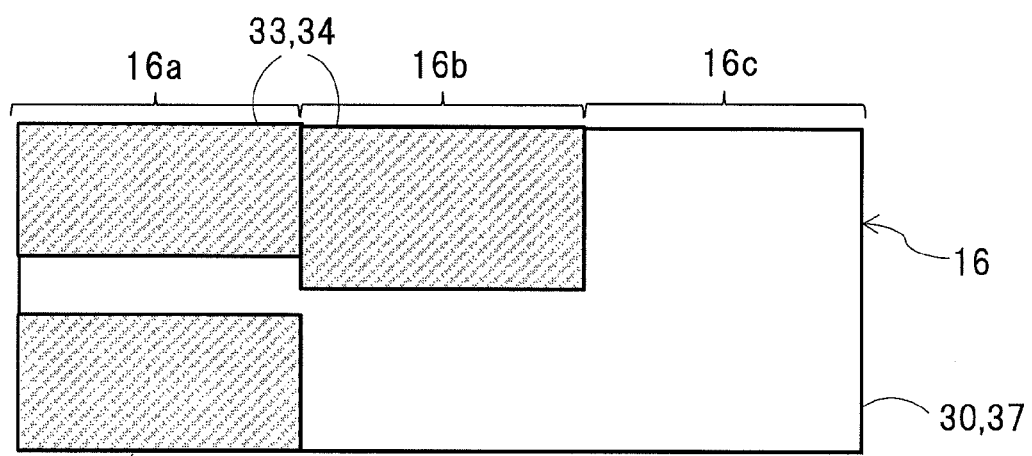
FIG. 8 is a planar view illustrating another example of the first photodetector.
Figure 9:
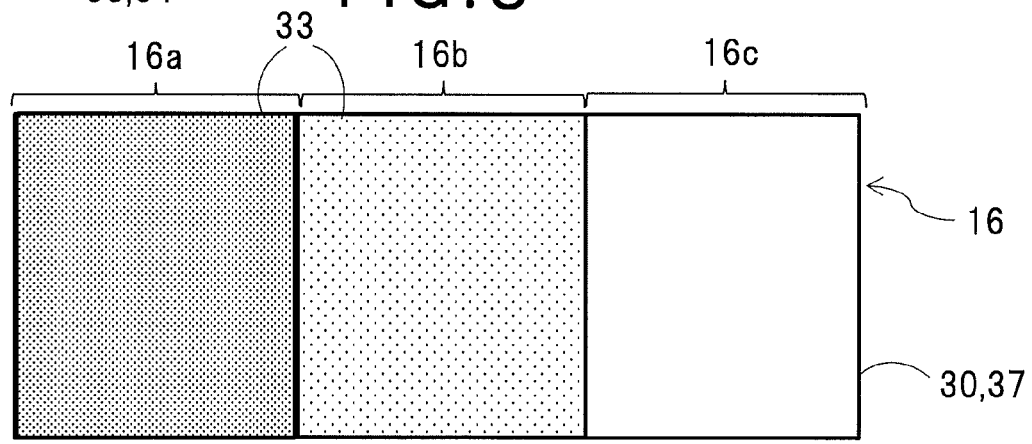
FIG. 9 is a planar view illustrating another example of the first photodetector.

FIGS. 8 and 9 are planar views each illustrating another example of the first photodetector 16. The photoelectric conversion element 30 has one photodiode 37. In FIGS. 8 and 9, the first photodetector 16 has the incident amount limiting member 33 in the same way as in FIGS. 5 and 6. In FIG. 8, the incident amount limiting member 33 is the light shielding layer 34 that shields the light. In FIG. 9, the incident amount limiting member 33 has the light transmittance according to the detection sensitivity.

Figure 10:
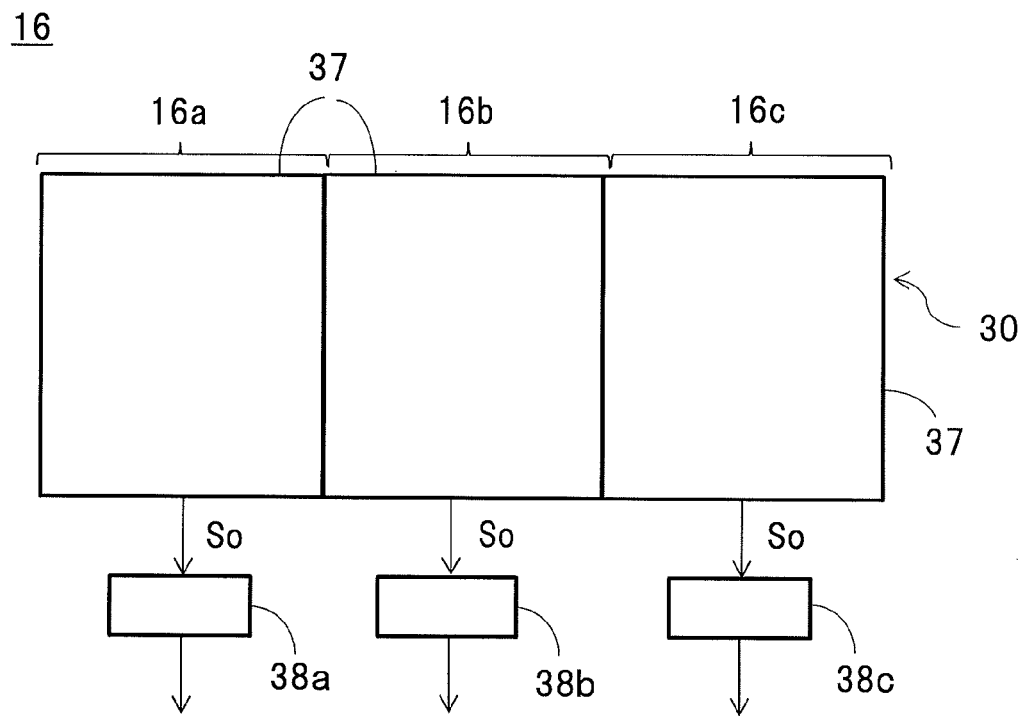
FIG. 10 is a view illustrating another example of the first photodetector.

FIG. 10 is a view illustrating another example of the first photodetector 16. The photoelectric conversion element 30 has the photodiode 37 that is arranged in each of the detection regions 16a to 16c. The three photodiodes 37 have the same detection sensitivity.

The first photodetector 16 has amplification circuits 38a to 38c that amplify an output signal So of each of the photodiodes 37 by an amplification factor according to the detection sensitivity. The amplification factor of the amplification circuit 38a is the lowest. The amplification factor of the amplification circuit 38b is a medium value. The amplification factor of the amplification circuit 38c is the highest.

Figure 11:
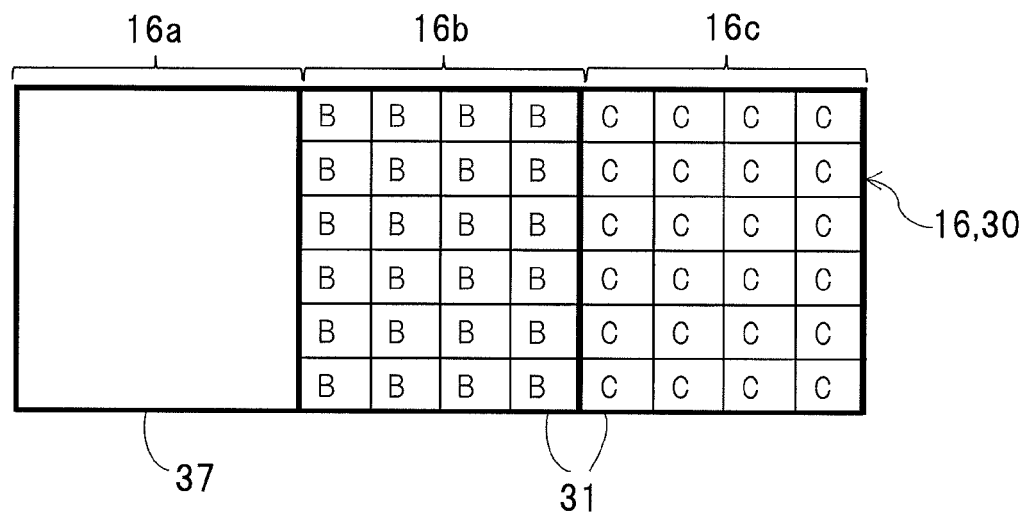
FIG. 11 is a view illustrating another example of the first photodetector.

FIG. 11 is a view illustrating another example of the first photodetector 16. The photoelectric conversion element 30 has the photon counting device 31 and the photodiode 37. The detection efficiency of the photon counting device 31 in the detection region 16b is B (=50%), and the detection efficiency of the photon counting device 31 in the detection region 16c is C (=100%).

The photon counting device 31 is saturated when strong light enters, and a predetermined time is necessary to become capable of detecting the light again. In FIG. 11, the photon counting device 31 is provided to the detection regions 16b and 16c where the scattered light L2 having medium and weak intensity enters. Accordingly, the photon counting device 31 is hardly saturated since the strong scattered light L2 does not enter, whereby it is possible to detect the scattered light L2.

The photodiode 37 is provided in the detection region 16a. Although the photodiode 37 has a detectable signal-to-noise ratio (S/N) lower than that of the photon counting device 31, it is capable of securely detecting the scattered light L2 in the detection region 16a where the strong scattered light L2 enters.

It is possible to set the different detection sensitivity for each of the detection regions by configurations in FIGS. 7 to 11 as well.

As described above, according to this embodiment, the first photodetector 16 has the plurality of detection regions each having the different detection sensitivity of the light. The first photodetector 16 is configured such that the scattered light L2 enters the detection region having the higher detection sensitivity as the distance becomes longer. Therefore, the distance measuring device of this embodiment is capable of reducing the range-finding error.

(Second Embodiment)

In a second embodiment, a third optical element 22 is provided.

FIGS. 12A and 12B are views illustrating a schematic configuration of a part of a distance measuring device 1A according to the second embodiment. In addition to the configuration of the distance measuring device 1 in FIG. 1, the distance measuring device 1A includes the third optical element 22 provided between a first optical element 12 and a first photodetector 16. In FIGS. 12A and 12B, only the configuration around the third optical element 22 is illustrated. Illustration of other configuration is omitted as it is the same as that in FIG. 1. Hereinafter, a description will be given mainly on a difference with FIG. 1.

The third optical element 22 emits scattered light L2, which is incident from the first optical element 12, to the first photodetector 16 at an emission angle θ2 that is larger than an incident angle θ1 of the scattered light L2. When N is a constant, it can be expressed generally as θ2=N·θ1. The incident angle θ1 is an angle formed by a normal line direction nd of an incident surface 22a of the third optical element 22 and an optical axis of the incident light. The emission angle θ2 is an angle formed by the normal line direction nd and an optical axis of the emitted light. The third optical element 22 is, for example, a lens.

FIG. 12A is view illustrating a case where a distance to an object to be measured 100 is short. In the case illustrated in FIG. 12A, the scattered light L2 enters in parallel to the normal line direction nd. That is, in a case where the incident angle θ1 is zero, the third optical element 22 emits the scattered light L2 at the emission angle θ2=0. In other words, the scattered light L2 advances substantially rectilinearly. Then, the scattered light L2 enters a detection region 16a.

FIG. 12B is a view illustrating a case where the distance to the object to be measured 100 is long. In the case illustrated in FIG. 12B, the scattered light L2 enters the third optical element 22 at the incident angle θ1 (≠0). The scattered light L2 is refracted by the third optical element 22 and is emitted at the emission angle θ2. The emission angle θ2 (>θ1) of the scattered light L2 becomes larger, and the scattered light L2 enters a detection region 16c.

Accordingly, according to this embodiment, it is possible to largely change an incident position of the scattered light L2 on the first photodetector 16 without enlarging a space between the first optical element 12 and the first photodetector 16. This is because an amount of deviation of the incident position on the first photodetector 16 can be approximately expressed as a product of the emission angle θ2 and the space between the first optical element 12 and the first photodetector 16. Therefore, it is possible to make the distance measuring device 1A smaller than that of the first embodiment For example, in a case where ambient light Lx enters the third optical element 22, since it is possible to make the emission angle θ2 of the ambient light Lx larger than the incident angle θ1 thereof, it is possible to prevent the ambient light Lx from entering the first photodetector 16. Accordingly, it is possible to make the distance measuring device of this embodiment to be less susceptible to an influence of the ambient light Lx than that of the first embodiment, whereby a range-finding error can be further reduced.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A distance measuring device comprising:
a light source configured to intermittently emit light;
a reflection device comprising a reflection surface configured to scan an object to be measured with the light by reflecting the light, and configured to reflect scattered light of the light scattered on the object to be measured;
a first photodetector configured to detect the scattered light that has been reflected; and
a calculation unit configured to calculate a distance from the reflection surface to each of positions on the object to be measured based on a detection result of the first photodetector, wherein
the first photodetector comprises a photoelectric conversion element comprising a plurality of detection regions each having different detection sensitivity of the light, and
the plurality of detection regions is arranged in order according to an incident position of the scattered light from the object to be measured at each of positions having the different distance.

2. The distance measuring device according to claim 1, wherein
the scattered light enters the detection region having the higher detection sensitivity as the distance becomes longer.

3. The distance measuring device according to claim 1, further comprising
a first optical element provided between the light source and the reflection surface, configured to cause the light to enter the reflection surface, and configured to cause the scattered light to reflect and enter the first photodetector.

4. The distance measuring device according to claim 1, further comprising an image generation unit configured to generate an image of the object to be measured based on the distance that has been calculated and an inclination angle of the reflection surface, wherein
the reflection device reflects the light by changing the inclination angle of the reflection surface.

5. The distance measuring device according to claim 1, further comprising
a second photodetector configured to detect the light emitted from the light source, wherein
the calculation unit calculates the distance by using a time difference between timing in which the light is detected by the second photodetector and timing in which the scattered light is detected by the first photodetector.

6. The distance measuring device according to claim 5, further comprising
a second optical element provided between the light source and the reflection surface and configured to cause a part of the light to enter the second photodetector.

7. The distance measuring device according to claim 1, wherein
the reflection device scans a plurality of parallel straight routes on the object to be measured with the light in the same direction in order.

8. The distance measuring device according to claim 1, wherein
the reflection device changes a travelling direction of the light by continuously changing the inclination angle of the reflection surface.

9. The distance measuring device according to claim 3, further comprising
a third optical element provided between the first optical element and the first photodetector, and configured to emit the scattered light, which is incident from the first optical element, to the first photodetector at an emission angle that is larger than an incident angle of the scattered light.

10. The distance measuring device according to claim 1, wherein
the first photodetector comprises an incident amount limiting member provided to the detection region, and configured to limit an incident light amount to the photoelectric conversion element to an incident amount according to the detection sensitivity.

11. A photodetector comprising:
a photoelectric conversion element comprising a plurality of detection regions each having different detection sensitivity according to the distance to a measurement target, wherein
the plurality of detection regions is arranged so that scattered light incident on the detection regions has a higher detection sensitivity as the distance to the measurement target increases.

12. The photodetector according to claim 11, further comprising
an incident amount limiting member provided to the detection region, and configured to limit an incident light amount to the photoelectric conversion element to an incident amount according to the detection sensitivity.

13. The photodetector according to claim 12, wherein
the incident amount limiting member is a light shielding layer configured to shield the light.

14. The photodetector according to claim 13, wherein
an area of the light shielding layer in the detection region having the high detection sensitivity is smaller than an area of the light shielding layer in the detection region having the low detection sensitivity.

15. The photodetector according to claim 12, wherein the incident amount limiting member has a light transmittance according to the detection sensitivity.

16. The photodetector according to claim 11, wherein the photoelectric conversion element comprises a photodiode arranged in each of the detection regions.

17. The photodetector according to claim 16, wherein the photodiode is an avalanche photodiode having a multiplication factor according to the detection sensitivity, and
a bias voltage according to the multiplication factor is supplied to each of the photodiodes.

18. The photodetector according to claim 11, wherein the photoelectric conversion element comprises a photodiode arranged in each of the detection regions, and
the photodetector comprises an amplification circuit configured to amplify an output signal of each of the photodiodes by an amplification factor according to the detection sensitivity.

19. The photodetector according to claim 11, wherein the photoelectric conversion element comprises a photon counting device arranged in each of the detection regions and configured to count the number of incident photons, and
the photon counting device comprises different detection efficiency in each of the detection regions.

20. The photodetector according to claim 11, wherein the photoelectric conversion element comprises:
a photon counting device arranged in the detection region having the highest detection sensitivity, and configured to count the number of incident photons; and
a photodiode arranged in the detection region having the lowest detection sensitivity, and configured to continuously change an output signal according to an incident light amount.

* * * * *